US005971799A

United States Patent [19]

Swade

[11] Patent Number: 5,971,799

[45] Date of Patent: Oct. 26, 1999

[54] Y-SHAPED HARNESS FOR THE INTERCONNECTION BETWEEN A VEHICLE RADIO, A VEHICLE HARNESS AND ADD-ON ELECTRONIC DEVICE

[76] Inventor: George Swade, 2510 Commonwealth, North Chicago, Ill. 60064

[21] Appl. No.: 08/842,085

[22] Filed: Apr. 26, 1997

[51] Int. Cl.[6] .................... H01R 31/02

[52] U.S. Cl. .................... 439/502; 439/623

[58] Field of Search .................... 439/502, 623, 439/505, 507, 638, 639

[56] References Cited

U.S. PATENT DOCUMENTS

| | | | |
|---|---|---|---|
| 2,047,152 | 7/1936 | Mitchell . | |
| 3,711,633 | 1/1973 | Ghirardi et al. . | |
| 4,280,062 | 7/1981 | Miller et al. . | |
| 4,378,853 | 4/1983 | Chia et al. . | |
| 4,415,217 | 11/1983 | Clabburn et al. . | |
| 4,815,984 | 3/1989 | Sugiyama et al. . | |
| 4,822,956 | 4/1989 | Sepe . | |
| 5,184,960 | 2/1993 | Hopkins et al. . | |
| 5,439,390 | 8/1995 | Raynor et al. | 439/502 |
| 5,507,668 | 4/1996 | Lambrinos et al. | 439/502 |
| 5,547,399 | 8/1996 | Naghi et al. | 439/502 |

*Primary Examiner*—Hien Vu

*Attorney, Agent, or Firm*—Thomas I. Rozsa; Tony D. Chen; Jerry Fong

[57] ABSTRACT

A wire harness which is generally a Y-shaped configuration for the interconnection between a standard main vehicle wire harness, a standard vehicle radio and an after market add-on electronic device. The Y-shaped wire harness eliminates the need to hardwire the after market electronic device to the vehicle main wire harness and also eliminates the need for an after market radio. The Y-shaped wire harness comprises three connectors at each location on the Y-shaped configuration, wherein each connector respectively mates to corresponding connectors provided on the standard vehicle radio, the main vehicle wire harness and the add-on electronic device.

10 Claims, 5 Drawing Sheets

Y-SHAPED HARNESS FOR THE INTERCONNECTION BETWEEN A VEHICLE RADIO, A VEHICLE HARNESS AND ADD-ON ELECTRONIC DEVICE

BACKGROUND OF THE INVENTION

1. Field of the Invention

The present invention generally relates to the field of vehicles. More particularly, the present invention relates to the field of harnesses for the interconnection between a standard vehicle radio, a standard vehicle harness, and an add-on electronic device.

2. Description of the Prior Art

Referring to FIG. 1, there is illustrated a conventional method of interconnecting a factory audio system 2 into a vehicle (not shown). The factory audio system 2 comprises a standard main vehicle wire harness 3 with a connector 4 at one end, a standard vehicle radio 5 which has a wire harness 6 with a connector 7, a battery 8 for providing power to the vehicle radio 5 and a vehicle speaker system 9 for providing audio output. The connector 4 from the vehicle wire harness 3 is connected to the connector 7 from the wire harness 6 of the vehicle radio 5. The battery 8 and the speaker system 9 are usually connected from the other end of the main vehicle wire harness 3.

To improve the sound quality of a factory audio system 2, a person would need to replace the radio 5 and the speakers 9 to improve the sound quality. Specifically, an after market audio system is preferably installed into the vehicle to improve the sound quality. To install the after market audio system, one must remove the standard vehicle radio 5 and cut off the connector 4 from the main vehicle wire harness 3 and splice the wires to connect the after market radio and speakers. The disadvantage with this traditional wiring of the after market audio system is that the installer must be competent in order to correctly hardwire the after market audio system to the main vehicle wire harness 3. If this is not done correctly, the audio system may malfunction, requiring the owner of the vehicle to spend more money to correct the problem caused by the incompetent installer. Another disadvantage is that by cutting off the connector from the vehicle, it voids the warranty on the vehicle and also violates the lease agreement.

The following eight (8) prior art patents were uncovered in the pertinent field of the present invention:

1. U.S. Pat. No. 2,047,152 issued to Mitchell on Jul. 7, 1936 for "Automobile Radio Cable" (hereafter the "Mitchell Patent");

2. U.S. Pat. No. 3,711,633 issued to Ghirardi et al. on Jan. 16, 1973 for "Fitting Means For Axially Slit Corrugated Conduits" (hereafter the "Ghirardi Patent");

3. U.S. Pat. No. 4,280,062 issued to Miller et al. on Jul. 21, 1981 for "Auxiliary Light Wiring Harness" (hereafter the "Miller Patent");

4. U.S. Pat. No. 4,378,853 issued to Chia et al. on Apr. 5, 1983 for "Cavitation Nozzle Plate Adapter For Rock Bits" (hereafter the "Chia Patent");

5. U.S. Pat. No. 4,415,217 issued to Clabburn et al. on Nov. 15, 1983 for "Cable Joining Connector And Method" (hereafter the "Clabburn Patent");

6. U.S. Pat. No. 4,815,984 issued to Sugiyama et al. on Mar. 28, 1989 for "Wire Harness Assembly" (hereafter the "Sugiyama Patent");

7. U.S. Pat. No. 4,822,956 issued to Sepe on Apr. 18, 1989 for "Coaxial Cable" (hereafter the "Sepe Patent"); and 8. U.S. Pat. No. 5,184,960 issued to Hopkins et al. on Feb. 9, 15, 1993 for "Trailer Light Connection System" (hereafter the "Hopkins Patent").

The Mitchell Patent discloses an automobile radio cable. The Mitchell Patent is of interest with respect to the automobile radio cable with branches. It teaches inductively winding the lead wire about an insulated core, and providing a suitable insulated shield around the inductance, thereby providing a balancing capacity effect.

The Ghirardi Patent discloses a fitting means for axially slit corrugated conduits. It comprises a flexible axially slit corrugated tube for housing a plurality of electrical leads.

The Miller Patent discloses an auxiliary light wiring harness for use with a vehicle headlight system. The harness comprises a three prong plug adapted for connection to the existing vehicle plug, a pair of female plugs adapted for connection to a pair of vehicle headlights, and auxiliary connectors adapted for connection to a pair of auxiliary headlamps. The harness also comprises wires connected to the three prong plug, the pair of female plugs and the auxiliary connectors, and a six pole two position switch connected to the wires and operable to allow an operator to energize the vehicle headlights or the auxiliary headlamps.

The Chia Patent discloses a cavitation nozzle plate adapter for rock bits.

The Clabburn Patent discloses a cable joining connector and method. The re-enterable cable jointing connector is used for low voltage electrical power distribution network cables and a method of using the connector to isolate cables physically and chemically one from another, while achieving in-line electrical connection as well as environmental sealing adequate for underground burial.

The Sugiyama Patent discloses a wire harness assembly for mounting the work onto the vehicle body and the connection work between the electronic or electric parts and the connectors. It comprises a primary wire bundle and a plurality of branch wires branched from the primary wire bundle which is received in a wire protective casing. The protective casing is composed of a casing body and a casing cover along with the arrangement configuration of the wire harness. A plurality of engagement holes are formed in the protective casing, corresponding to connectors provided at terminal ends of the branch wires. Cushion arms that are engaged with engagement holes are formed on outer walls of housings of the connectors, so that the connectors are displaceable relative to the engagement holes.

The Sepe Patent discloses a coaxial cable. The cable is constructed by removing the outer insulation from a section of two single coaxial cables, electrically connecting together the exposed shields of each cable at both ends of the exposed section and reinsulating the abutted cables so that the shields remain in contact along their entire length.

The Hopkins Patent discloses a trailer light connection system. It comprises a T-shaped connector having three terminals which include a modularized tap plug as the third terminal for direct or indirect connection to the trailer lighting system.

None of these prior art patents have disclosed a wire harness for the interconnection between a standard vehicle radio, a standard main vehicle harness and an after market add-on electronic device. Therefore, it is desirable to provide a wire harness with the capability of rapidly interconnecting the standard vehicle radio, the standard main vehicle harness and the add-on electronic device so that a person does not have to be electrically or mechanically inclined to install an after market add-on electronic device to a vehicle.

It is also desirable to provide a wire harness that is flexible so that additional accessories may be installed into a vehicle.

SUMMARY OF THE INVENTION

The present invention is a unique wire harness which is generally a Y-shaped configuration for the interconnection between a standard main vehicle wire harness, a standard vehicle radio and an after market add-on electronic device. The present invention Y-shaped wire harness eliminates the need to hardwire the after market electronic device to the vehicle main wire harness and also eliminates the need for an after market radio. The Y-shaped harness comprises three connectors at each location on the Y-shaped configuration, wherein each connector respectively mates to corresponding connectors provided on the standard vehicle radio, the main vehicle wire harness and the add-on electronic device.

It is therefore an object of the present invention to provide a Y-shaped wire harness having connector means at each branch end of the Y-shaped configuration for the interconnection between the respective connectors of a standard vehicle radio, an add-on electronic device, and a standard main vehicle wire harness wherein no hardwiring or splicing is required so that no hardwiring mistakes can be made when installing an add-on electronic device to the standard equipment provided by the vehicle.

In the preferred embodiment, the present invention is a wire harness which is generally a Y-shaped configuration.

In an alternative embodiment, the present invention is a combination of a Y-shaped wire harness and a straight extension wire harness.

In another alternative embodiment, the present invention is a Y-shaped wire harness which is integrally formed with a straight extension wire harness, thereby forming a unitary wire harness.

In still another alterative embodiment, the present invention is a combination of a Y-shaped wire harness and a power extension wire harness.

In still a further alternative embodiment, the present invention is two Y-shaped wire harnesses.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
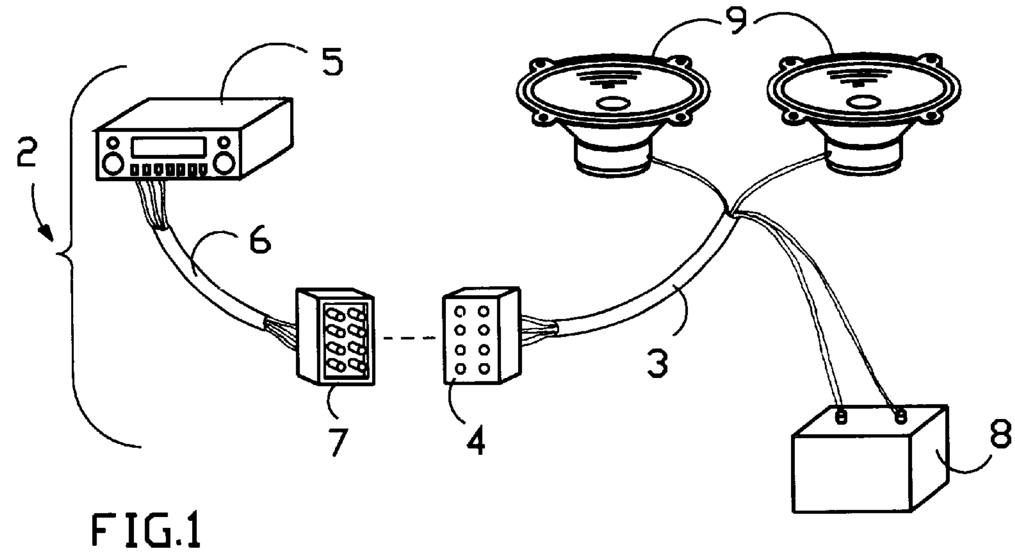
FIG. 1 is an illustration of a prior art standard vehicle audio system, showing the interconnections of the standard vehicle audio system.
Figure 2:
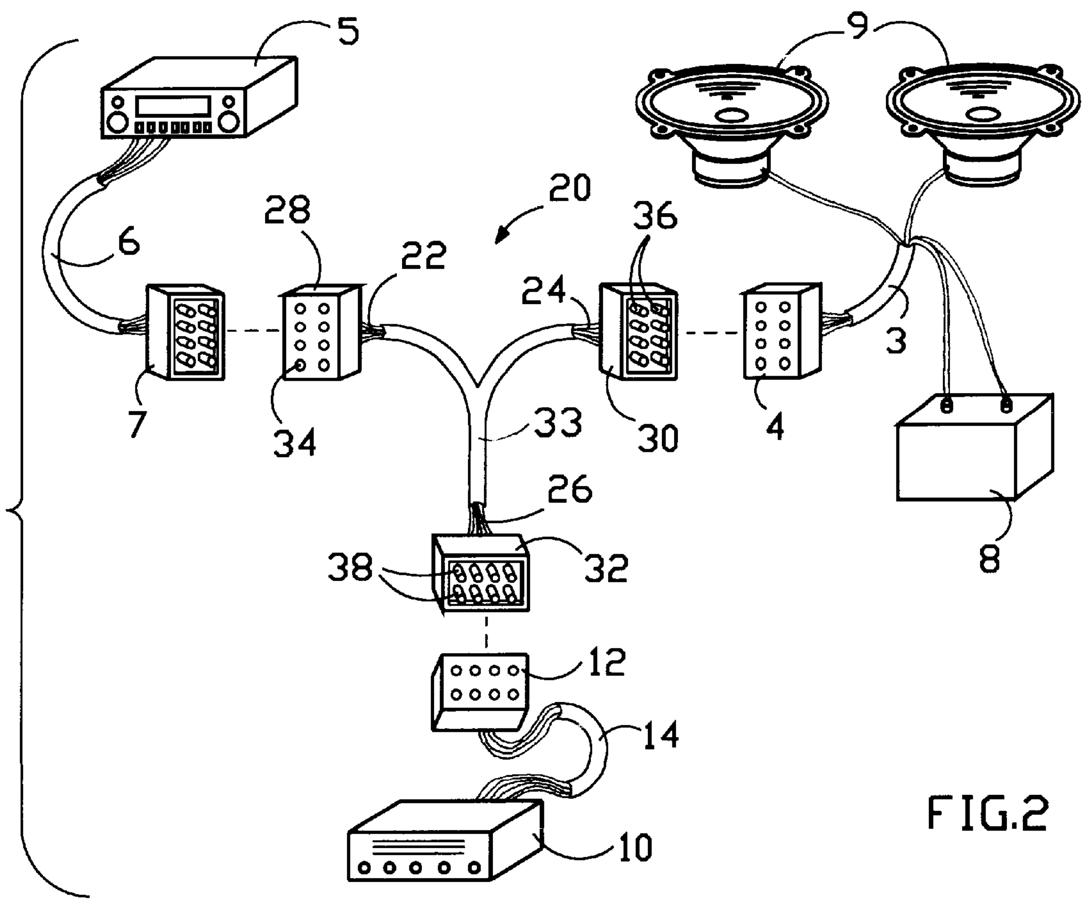
FIG. 2 is an illustration of the preferred embodiment of the present invention Y-shaped wire harness, showing the interconnection between a standard main vehicle wire harness, a standard vehicle radio and an add-on electronic device.

Referring to FIG. 2, there is shown a preferred embodiment of the present invention wire harness 20 which is generally a Y-shape configuration. The wire harness 20 has three branch end wires 22, 24 and 26, wherein each one of the three branch end wires has connector means 28, 30 and 32 respectively. The wire harness 20 is composed of a plurality of electrical wires which are enclosed by an insulated sleeve 33 or any other suitable means, such as electrical tape. The electrical wire means of the wire harness 20 are interconnected between the connectors 28, 30, and 32 for providing electrical power from the power source 8 to the radio 5, for conveying electronic signals between the radio 5 and the add-on electronic device 10, and for delivering audio signals to the speaker system 9 when the respective connector means 7, 4, and 12 of the standard vehicle radio 5, the add-on electronic device 10, and the standard main vehicle wire harness 3 respectively are connected to the wire harness 20.

The first connector means 28 is adapted for electrical connection to an existing radio plug 7 which in turn is connected to a wire harness 6 which in turn is connected to a standard vehicle radio 5. The first connector means 28 is illustrated as a female plug having a plurality of sockets 34, and which is connected to the corresponding male plug 7 having a plurality of prongs or pins. It is emphasized that while the first connector means 28 is illustrated as a female plug in the drawing, it is also within the spirit and scope of the present invention to have a male plug instead, depending on the configuration of the existing radio plug 7.

The second connector means 30 is preferably in the form of a male plug having a plurality of prongs or pins 36 adapted for electrical connection to an existing corresponding main vehicle plug 4, which in turn is connected to a wire harness 3 which in turn is connected to the vehicle's standard equipment, such as a speaker system 9, a battery 8, etc. It is emphasized that while the second connector means 30 is illustrated as a male plug in the drawing, it is also within the spirit and scope of the present invention to have a female plug instead, depending on the configuration of the existing main vehicle plug 4.

The third connector means 32 is preferably in the form of a male plug having a plurality of prongs or pins 38 adapted for electrical connection to a corresponding plug 12, which in turn is connected to a wire harness 14 which in turn is connected to an add-on electronic device 10. It is emphasized that while the third connector means 32 is illustrated as a male plug in the drawing, it is also within the spirit and scope of the present invention to have a female plug instead, depending on the configuration of the plug 12 on the add-on electronic device 10. The add-on electronic device 10 may be a sub-woofer enclosure with a built-in amplifier. In the drawing, the wire harness 14 is directly connected to the add-on electronic device 10, however, the plug 12 may be directly attached to the back of the add-on electronic device 10, thereby eliminating the need for the wire harness 14.

The present invention wire harness 20 provides the electrical continuity between the connector means 28, 30 and 32 which in turn are connected to their respective standard existing plugs in the vehicle and the add-on electronic device. In order to install the wire harness 20, the existing plugs 7 and 4 from the radio harness 6 and the main vehicle harness 3 are disconnected from each other. The first connector means 28 of the wire harness 20 is then connected to the radio plug 7 and the second connector means 30 is connected to the main vehicle plug 4. The third connector means 32 is then connected to the plug 12 provided on the add-on device 10, and thereby the present invention provides a simple method of interconnection between the standard audio equipment provided in a vehicle and an add-on electronic device.

The present invention conforms to conventional forms of manufacture or any other conventional way known to one skilled in the art, and is of simple construction and is easy to use.

Figure 3:
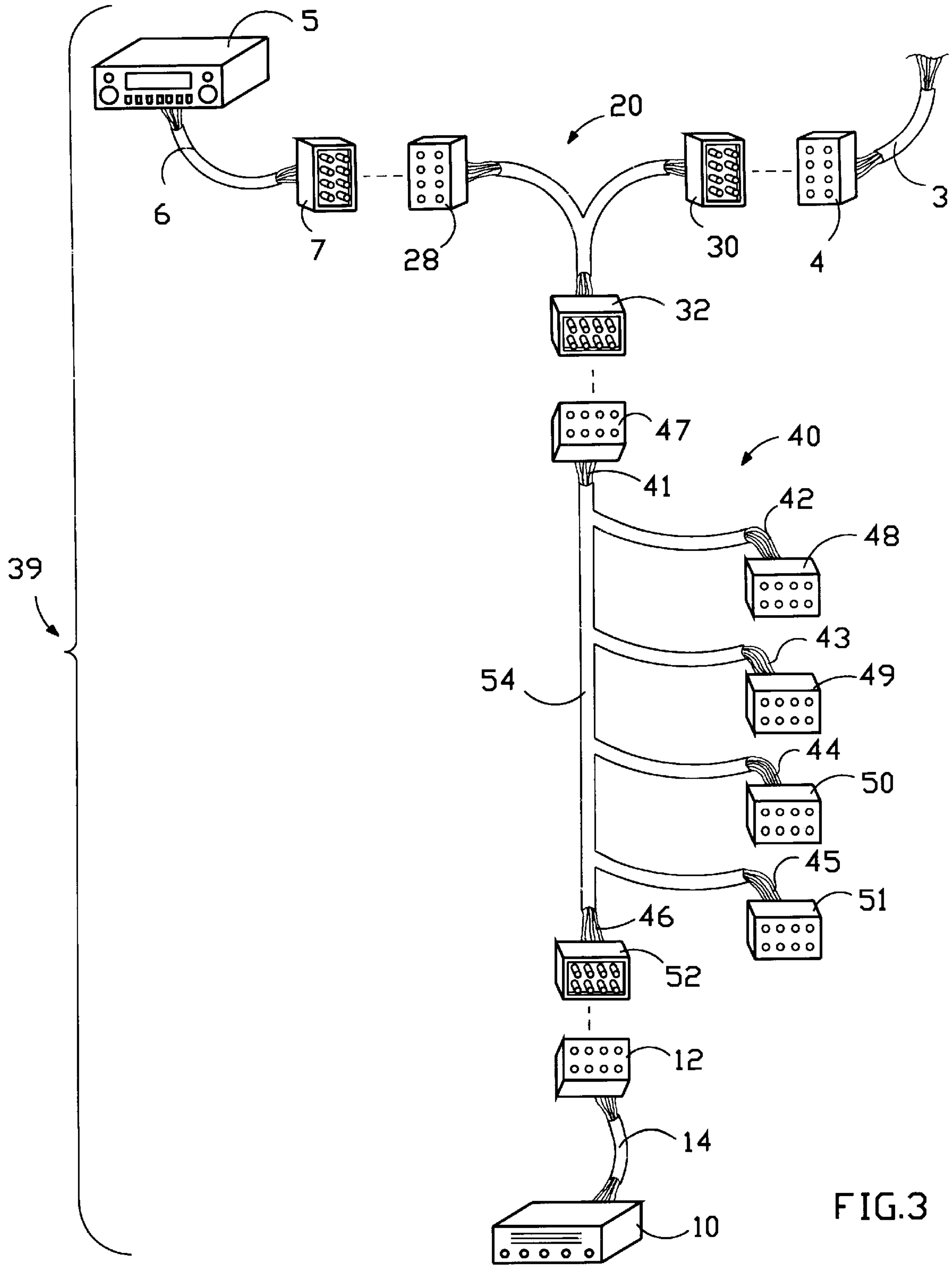
FIG. 3 is an illustration of an alternative embodiment of the present invention, showing a Y-shaped wire harness and a straight extension wire harness.

Referring to FIG. 3, there is shown at 39 an alternative embodiment of the present invention which includes a combination of a Y-shaped wire harness 20 and a straight extension wire harness 40. The Y-shaped wire harness 20 shown in FIG. 3 is identical to and plugs the same way as the Y-shaped wire harness 20 shown in FIG. 2, and the description thereof will not be repeated. Only the new elements will now be described in detail below.

The straight extension wire harness 40 comprises a plurality of branch end wires 41, 42, 43, 44, 45 and 46, wherein each one of the branch end wires has connector means 47, 48, 49, 50, 51 and 52 respectively. The straight extension wire harness 40 is composed of a plurality of electrical wires which are enclosed by an insulated sleeve 54 or any other suitable means, such as electrical tape. The electrical wire means of the straight extension wire harness 40 are interconnected between the connector means 47, 48, 49, 50, 51 and 52 for providing electrical power from the power source to the radio 5, for conveying electronic signals between the radio and a plurality of add-on devices, and for delivering audio signals to a speaker system.

The first connector means 47 of the straight extension wire harness 40 is adapted for electrical connection to the third connector means 32 of the Y-shaped wire harness 20. It is emphasized that while the first connector means 47 of the straight extension wire harness 40 is illustrated as a female plug in the drawing, it is also within the spirit and scope of the present invention to have a male plug, instead, depending on the configuration of the third connector means 32 of the Y-shaped wire harness 20.

The sixth connector means 52 is preferably in the form of a male plug having a plurality of prongs or pins adapted for electrical connection to a corresponding plug 12, which in turn is connected to a wire harness 14 which in turn is connected to an add-on electronic device 10. It is emphasized that while the sixth connector means 52 of the straight extension wire harness 40 is illustrated as a male plug in the drawing, it is also within the spirit and scope of the present invention to have a female plug instead, depending on the configuration of the plug 12 on the add-on electronic device 10. The add-on electronic device 10 may be a sub-woofer enclosure with a built-in amplifier. In the drawing, the wire harness 14 is directly connected to the add-on electronic device 10, however, the plug 12 may be directly attached to the back of the add-on electronic device 10, thereby eliminating the need for the wire harness 14.

The connector means 48, 49, 50 and 51 are preferably female plugs wherein each one has a plurality of sockets adapted for electrical connection to corresponding plugs, such as a cellular phone, alarm, CD changer and other accessories (all not shown). It is emphasized that while the connector means 48 through 51 of the straight extension wire harness 40 is illustrated as a female plug in the drawing, it is also within the spirit and scope of the present invention to have a male plug instead, depending on the configuration of the corresponding plugs provided on the vehicle accessories.

Figure 4:
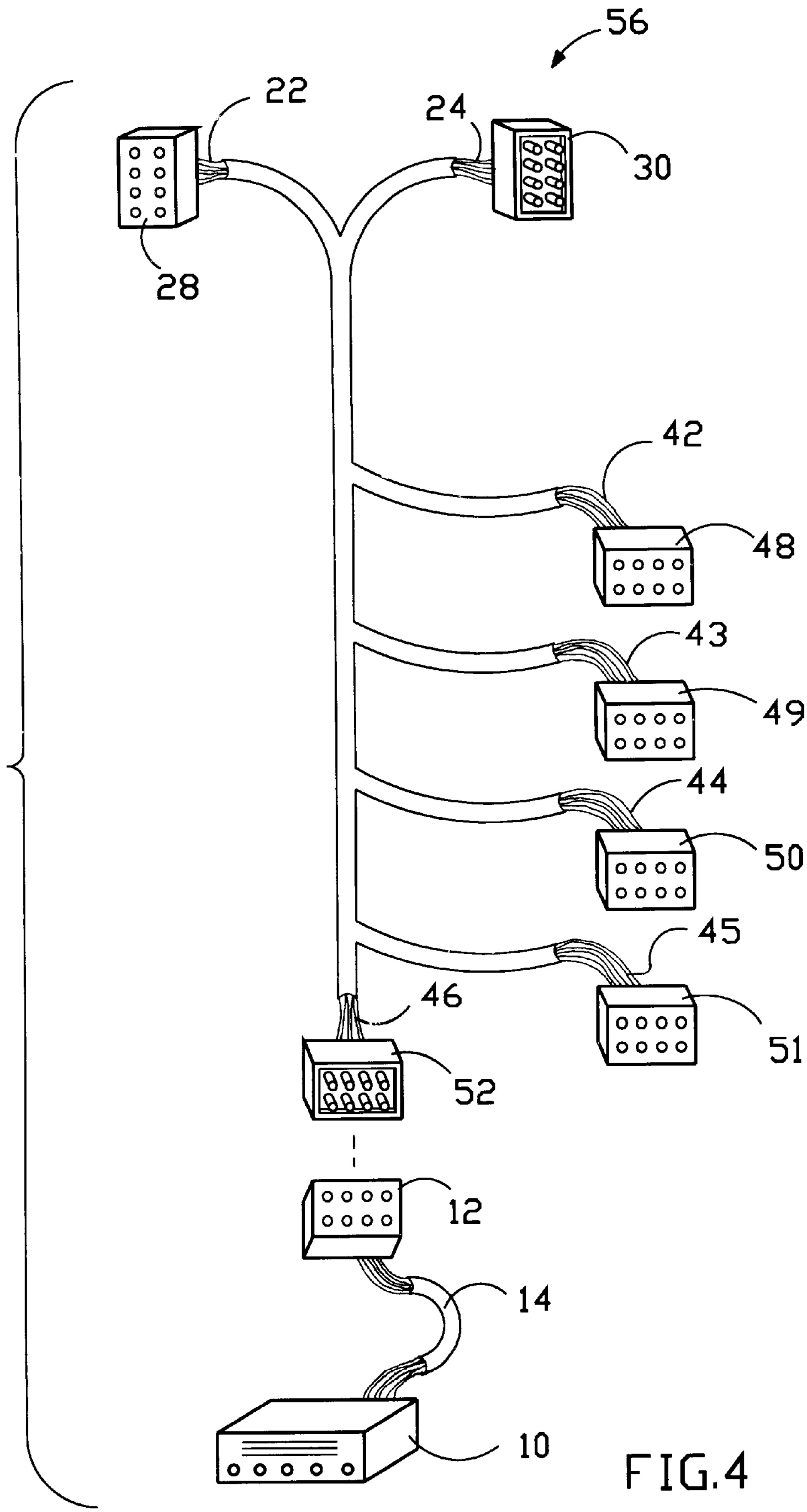
FIG. 4 is an illustration of another alternative embodiment of the present invention, showing a Y-shaped wire harness integrally formed with a straight extension wire harness.

Referring to FIG. 4, there is shown at another alternative embodiment of the present invention wire harness 56. In this embodiment, the wire harness 56 is similar to the combination shown in FIG. 3, except that the connector means 32 and 47 of FIG. 3 are eliminated and their ends are integrally formed together to form a unitary wire harness 56. The wire harness 56 functions and plugs the same way as in the preceding embodiments shown in FIGS. 2 and 3, and the description thereof will not be repeated. The reference numerals used in FIG. 4 are the same reference numerals used in FIGS. 2 and 3.

Figure 5:
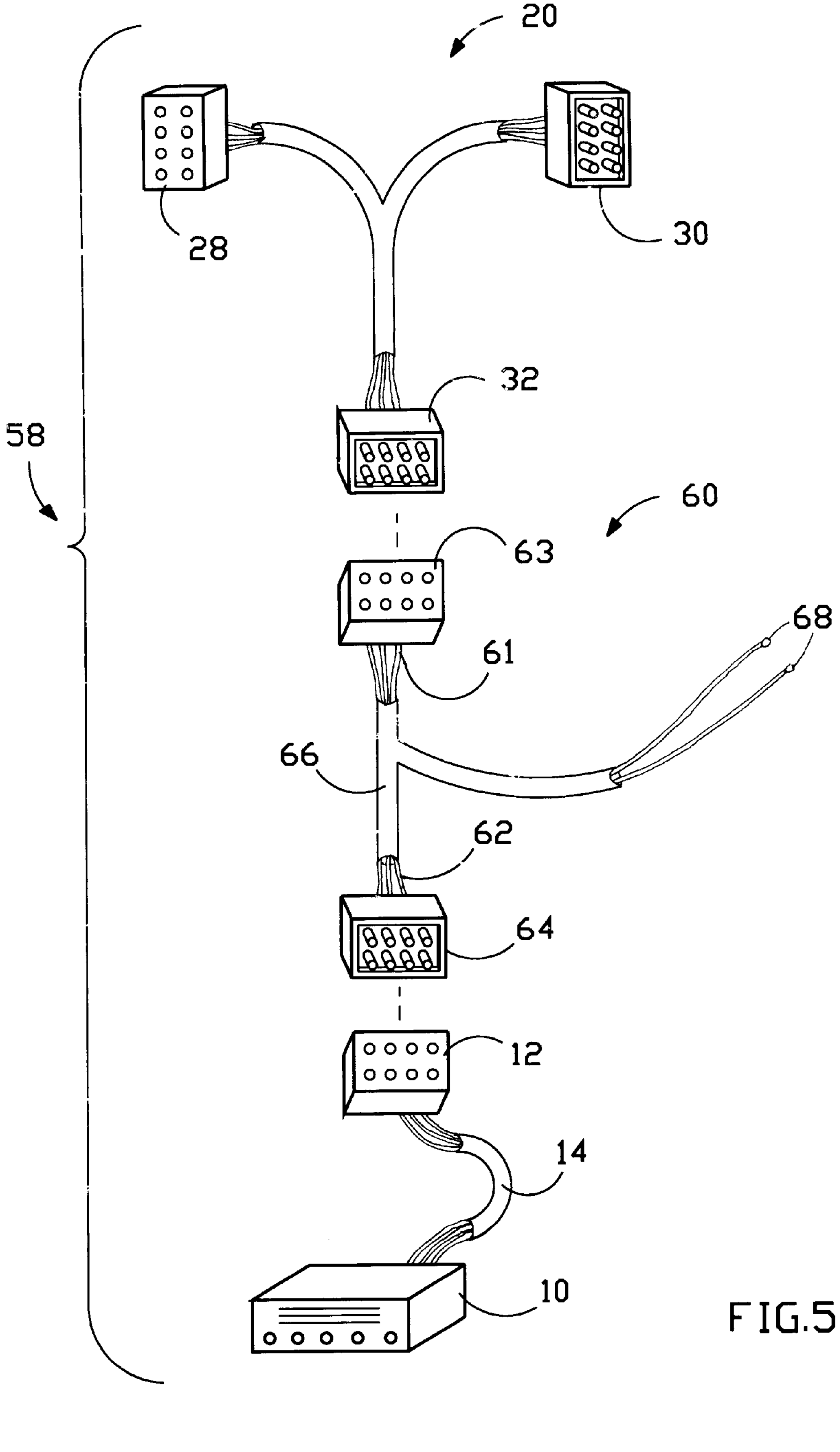
FIG. 5 is an illustration of still another alternative embodiment of the present invention, showing a Y-shaped wire harness and a power extension harness.

Referring to FIG. 5, there is shown at 58 still another alternative embodiment of the present invention which includes a Y-shaped wire harness 20 and a power extension wire harness 60. The Y-shaped wire harness 20 shown in FIG. 5 is identical to and plugs the same way as the Y-shaped wire harness 20 shown in FIG. 2, and the description thereof will not be repeated. Only the new elements will now be described in detail below.

The power extension wire harness 60 comprises two opposite branch end wires 61 and 62, wherein each one of the branch end wires has connector means 63 and 64 respectively. The power extension wire harness 60 is composed of a plurality of electrical wires which are enclosed by an insulated sleeve 66 or any other suitable means, such as electrical taping means. The electrical wires are interconnected to the connector means 63 and 64 for providing electrical power from a power source to a radio, for conveying electronic signals between the radio and an add-on device 10, and for delivering audio signals to a speaker system.

The first connector means 63 of the power extension wire harness 60 is adapted for electrical connection to the third connector means 32 of the Y-shaped wire harness 20. It is emphasized that while the first connector means 63 of the power extension wire harness 60 is illustrated as a female plug in the drawing, it is also within the spirit and scope of the present invention to have a male plug instead, depending on the configuration of the corresponding third connector means 32 of the Y-shaped wire harness 20.

The second connector means 64 is preferably in the form of a male plug having a plurality of prongs or pins adapted for electrical connection to a corresponding plug 12, which in turn is connected to a wire harness 14 which in turn is connected to an add-on electronic device 10. It is emphasized that while the second connector means 64 of the power extension wire harness 60 is illustrated as a male plug in the drawing, it is also within the spirit and scope of the present invention to have a female plug instead, depending on the configuration of the plug 12 on the add-on electronic device

10. The add-on electronic device 10 may be a sub-woofer enclosure with a built-in amplifier, which is identical to the one shown in FIG. 2.

The power extension wire harness 60 also includes conductor means, preferably in the form of a pair of wires 68 for connecting directly to the vehicle's battery to provide additional electrical power to the add-on electronic device 10.

Figure 6:
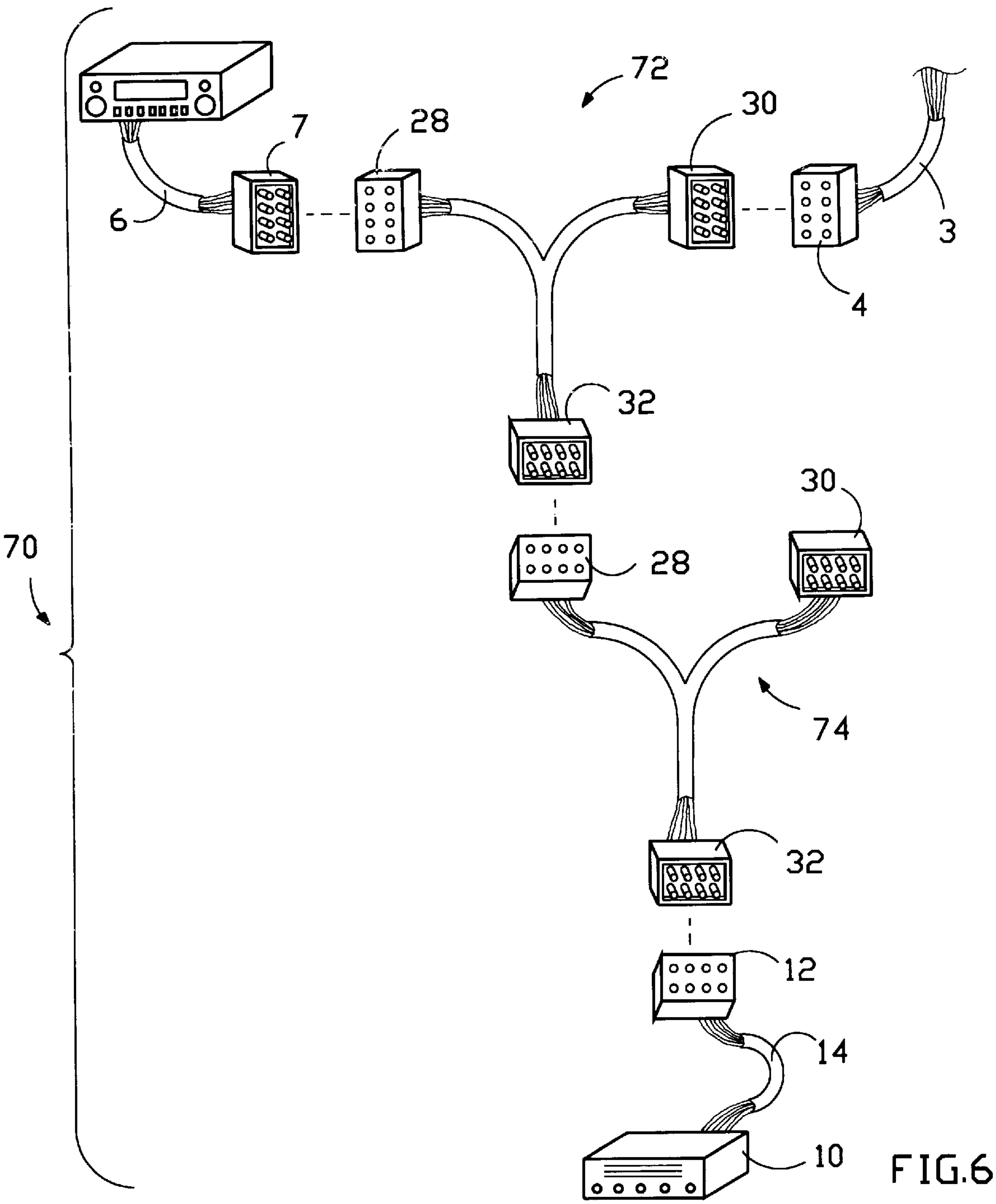
FIG. 6 is an illustration of still a further alternative embodiment of the present invention, showing two Y-shaped wire harnesses.

Referring to FIG. 6, there is shown at 70 still a further alternative embodiment of the present invention which includes two Y-shaped wire harnesses 72 and 74. These two Y-shaped wire harnesses 72 and 74 are identical to the one shown in FIG. 2, and the description thereof will not be repeated. In this embodiment, the reference numerals for the connector means are the same ones used in FIG. 2, and will be utilized in the description thereof.

In order to install the wire harnesses 72 and 74, the existing plugs 7 and 4 from the radio harness 6 and the main vehicle harness 3 are disconnected from each other. The first connector means 28 of the wire harness 72 is then connected to the radio plug 7 and the second connector means 30 of the wire harness 72 is connected to the main vehicle plug 4. The third connector means 32 of the first wire harness 72 is then connected to the first connector means 28 of the second wire harness 74. The third connector means 32 of the second wire harness 72 is then connected to the plug 12 provided on the add-on device 10. The second connector means 30 of the second wire harness 74 can be connected to other auxiliary accessories.

Defined in detail, the present invention is a wire harness for the interconnection between the respective connectors of a standard vehicle radio, an add-on electronic device, and a standard main vehicle wire harness which is connected to an electrical power source and a speaker system, the wire harness comprising: (a) a generally Y-shaped body having a first branch end, a second branch end and a third branch end; (b) first connector means installed on the first branch end of the Y-shaped body and adapted for connection to the connector of the radio; (c) second connector means installed on the second branch end of the Y-shaped body and adapted for connection to the connector of the main wire harness; (d) third connector means installed on the third branch end of the Y-shaped body and adapted for connection to the connector of the add-on electronic device; and (e) wire means interconnecting the first, second and third connector means for providing electrical power from the power source to the radio and the add-on electronic device, for conveying electronic signals between the radio and the add-on electronic device, and for delivering audio signals to the speaker system.

Defined alternatively in detail, the present invention is an apparatus for the interconnection between the respective connectors of a standard vehicle radio, at least two add-on devices, and a standard main vehicle wire harness which is connected to a power source and a speaker system, the apparatus comprising: (a) a generally Y-shaped wire harness having a first branch end, a second branch end and a third branch end; (b) first connector means installed on the first branch end of the Y-shaped wire harness and adapted for connection to the connector of the radio; (c) second connector means installed on the second branch end of the Y-shaped wire harness and adapted for connection to the connector of the main wire harness; (d) third connector means installed on the third branch end of the Y-shaped wire harness; (e) first wire means interconnecting the first, second and third connector means for providing electrical power from the power source to the radio and the third connector means, for conveying electronic signals between the radio and the third connector means, and for delivering audio signals to the speaker system; (f) a straight extension wire harness having a plurality of branch ends, each branch end having connector means adapted for respective connection to the third connector means and the respective connectors of the at least two add-on devices; and (g) second wire means interconnecting the connector means of the straight extension wire harness for providing electrical power from the third connector means to the at least two add-on devices, for conveying electronic signals between the third connector means and a respective one of the at least two add-on devices, and for delivering audio signals to the speaker system.

Defined also alternatively in detail, the present invention is a wire harness for the interconnection between the respective connectors of a standard vehicle radio, at least two add-on devices, and a standard main vehicle wire harness which is connected to a power source and a speaker system, the wire harness comprising: (a) first connector means adapted for connection to the connector of the radio; (b) second connector means adapted for connection to the connector of the main wire harness; (c) third connector means adapted for connection to one of the connectors of the at least two add-on devices; (d) fourth connector means adapted for connection to the other one of the connectors of the at least two add-on devices; and (e) wire means interconnecting the first, second, third, and fourth connector means for providing electrical power to the radio and the at least two add-on devices, for conveying electronic signals between the radio and a respective one of the at least two add-on devices, and for delivering audio signals to the speaker system.

Defined further alternatively in detail, the present invention is an apparatus for the interconnection between the respective connectors of a standard vehicle radio, an add-on device, and a standard main vehicle wire harness which is connected to a power source and a speaker system, the apparatus comprising: (a) a generally Y-shaped wire harness having a first branch end, a second branch end and a third branch end; (b) first connector means installed on the first branch end of the Y-shaped wire harness and adapted for connection to the connector of the radio; (c) second connector means installed on the second branch end of the Y-shaped wire harness and adapted for connection to the connector of the main wire harness; (d) third connector means installed on the third branch end of the Y-shaped wire harness; (e) first wire means interconnecting the first, second and third connector means for providing electrical power from the power source to the radio and the third connector means, for conveying electronic signals between the radio and the third connector means, and for delivering audio signals to the speaker system; (f) a power extension wire harness having two opposite branch ends and conductor means, the conductor means adapted for connection to the power source for providing additional electrical power to the add-on device; (g) fourth connector means installed on one of the two opposite branch ends of the power extension wire harness and being connected to the third connector means of the Y-shaped wire harness; (h) fifth connector means installed on the other one of the two opposite branch ends of the power extension wire harness and adapted for connection to the connector of the add-on device; and (i) second wire means interconnecting the fourth and fifth connector means for providing electrical power from the third connector means to the add-on device, for conveying electronic signals between the third connector means to the add-on device, and for delivering audio signals to the speaker system.

Defined again further alternatively in detail, the present invention is a wire harness assembly for the interconnection between the respective connectors of a standard vehicle radio, an add-on device, and a standard main vehicle wire harness which is connected to a power source and a speaker system, the wire harness assembly comprising: (a) a generally Y-shaped wire harness having a first branch end, a second branch end, and a third branch end; (b) first connector means installed on the first branch end of the Y-shaped wire harness and adapted for connection to the connector of the radio; (c) second connector means installed on the second branch end of the Y-shaped wire harness and adapted for connection to the connector of the main wire harness; (d) third connector means installed on the third branch end of the Y-shaped wire harness; (e) first wire means interconnecting the first, second and third connector means for providing electrical power from the power source to the radio and the third connector means, for conveying electronic signals between the radio and the third connector means, and for delivering audio signals to the speaker system; (f) a generally second Y-shaped wire harness having a first branch end, a second branch end and a third branch end; (g) fourth connector means installed on the first branch end of the second Y-shaped wire harness and being connected to the third connector means of the first Y-shaped wire harness; (h) fifth connector means installed on the second branch end of the second Y-shaped wire harness and adapted for connection to another add-on device; (i) sixth connector means installed on the third branch end of the second Y-shaped wire harness and adapted for connection to the connector of the add-on device; and (j) second wire means interconnecting the fourth, fifth and sixth connector means for providing electrical power from the third connector means to the add-on device, for conveying electronic signals between the third connector means to the add-on device, and for delivering audio signals to the speaker system.

Defined broadly, the present invention is a wire harness for the interconnection between the respective connectors of a standard vehicle radio, an add-on device, and a standard main vehicle wire harness which is connected to a power source and a speaker system, the wire harness comprising: (a) a Y-shaped body having at least three branch ends; (b) first connector means installed on one of the at least three branch ends of the Y-shaped body and adapted for connection to the connector of the radio; (c) second connector means installed on the other two of the at least three branch ends of the Y-shaped body and adapted for connection to the connector of the main wire harness; (d) third connector means installed on the last one of the at least three branch ends of the Y-shaped body and adapted for connection to the connector of the add-on device; and (e) wire means interconnecting the first, second and third connector means for providing power from the power source to the radio and the add-on device, for conveying electronic signals between the radio and the add-on device, and for delivering audio signals to the speaker system.

Defined more broadly, the present invention is a wire harness for the interconnection between the respective connectors of a standard vehicle radio, an add-on device, and a standard main vehicle wire harness which is connected to a power source and a speaker system, the wire harness comprising: (a) first connector means adapted for connection to the connector of the radio; (b) second connector means adapted for connection to the connector of the main wire harness; (c) third connector means adapted for connection to the connector of the add-on device; and (d) wire means interconnecting the first, second and third connector means for providing power from the power source to the radio and the add-on device, for conveying electronic signals between the radio and the add-on device, and for delivering audio signals to the speaker system.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A wire harness for interconnection between respective connectors of a standard vehicle radio, an add-on electronic device, and a standard main vehicle wire harness which is connected to an electrical power source and a speaker system, the wire harness comprising:

a. a generally Y-shaped body having a first branch end, a second branch end and a third branch end;

b. first connector means installed on said first branch end of said Y-shaped body and adapted for connection to said connector of said radio;

c. second connector means installed on said second branch end of said Y-shaped body and adapted for connection to said connector of said main wire harness;

d. third connector means installed on said third branch end of said Y-shaped body and adapted for connection to said connector of said add-on electronic device;

e. wire means interconnecting said first, second and third connector means for providing electrical power from said power source to said radio and said add-on electronic device, for conveying electronic signals between said radio and said add-on electronic device, and for delivering audio signals to said speaker system; and f. said add-on electronic device including a sub-woofer with a built-in amplifier.

2. The wire harness in accordance with claim 1 wherein said first, second and third connector means include a female plug.

3. The wire harness in accordance with claim 1 wherein said first, second and third connector means include a male plug.

4. A wire harness for interconnection between respective connectors of a standard vehicle radio, an add-on device, and a standard main vehicle wire harness which is connected to a power source and a speaker system, the wire harness comprising:

a. a Y-shaped body having at least three branch ends;

b. first connector means installed on one of said at least three branch ends of said Y-shaped body and adapted for connection to said connector of said radio;

c. second connector means installed on the other two of said at least three branch ends of said Y-shaped body and adapted for connection to said connector of said main wire harness;

d. third connector means installed on the last one of said at least three branch ends of said Y-shaped body and adapted for connection to said connector of said add-on device;

e. wire means interconnecting said first, second and third connector means for providing power from said power source to said radio and said add-on device, for conveying electronic signals between said radio and said add-on device, and for delivering audio signals to said speaker system; and f. said add-on device including a sub-woofer with a built-in amplifier.

5. The wire harness in accordance with claim 4 wherein said first, second and third connector means include a female plug.

6. The wire harness in accordance with claim 4 wherein said first, second and third connector means include a male plug.

7. A wire harness for interconnection between respective connectors of a standard vehicle radio, an add-on device, and a standard main vehicle wire harness which is connected to a power source and a speaker system, the wire harness comprising:

a. first connector means adapted for connection to said connector of said radio;

b. second connector means adapted for connection to said connector of said main wire harness;

c. third connector means adapted for connection to said connector of said add-on device;

d. a generally Y-shaped wire means interconnecting said first, second and third connector means for providing power from said power source to said radio and said add-on device, for conveying electronic signals between said radio and said add-on device, and for delivering audio signals to said speaker system; and e. said add-on device including a sub-woofer with a built-in amplifier.

8. The wire harness in accordance with claim 7 further comprising a generally Y-shaped configuration.

9. The wire harness in accordance with claim 7 wherein said first, second and third connector means include a female plug.

10. The wire harness in accordance with claim 7 wherein said first, second and third connector means include a male plug.

* * * * *